(12) United States Patent
Vanderburg et al.

(10) Patent No.: US 9,604,260 B2
(45) Date of Patent: *Mar. 28, 2017

(54) GATE VALVE WITH TRACK CLEANOUT

(71) Applicant: Mueller International, LLC, Atlanta, GA (US)

(72) Inventors: Ralph William Vanderburg, Soddy Daisy, TN (US); Jared Aaron Brandt, Hixon, TN (US); Carlos Stephen Moreno, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,463

(22) Filed: Aug. 21, 2015

(65) Prior Publication Data

US 2015/0352602 A1 Dec. 10, 2015

Related U.S. Application Data

(63) Continuation of application No. 13/834,016, filed on Mar. 15, 2013, now Pat. No. 9,140,368.

(51) Int. Cl.
*F16K 3/316* (2006.01)
*B08B 1/00* (2006.01)
(Continued)

(52) U.S. Cl.
CPC ............ *B08B 1/005* (2013.01); *F16K 3/0218* (2013.01); *F16K 3/12* (2013.01); *F16K 3/316* (2013.01);
(Continued)

(58) Field of Classification Search
CPC ..... B08B 1/005; F16K 3/0218; F16K 3/3165; F16K 3/12; F16K 3/18; F16K 3/30;
(Continued)

(56) References Cited

U.S. PATENT DOCUMENTS 1,801,960 A 4/1931 Houser
1,823,394 A 9/1931 Geiger
(Continued)

FOREIGN PATENT DOCUMENTS

EP 0607708 7/1994
WO 2004010034 1/2004

OTHER PUBLICATIONS

Vanderburg, Ralph William; Issue Notification for U.S. Appl. No. 13/834,016, filed Mar. 15, 2013, mailed Sep. 2, 2015, 1 pg.
(Continued)

*Primary Examiner* — William McCalister
*Assistant Examiner* — Ian Paquette
(74) *Attorney, Agent, or Firm* — Taylor English Duma LLP

(57) ABSTRACT

Methods, systems, and apparatus for a gate valve include a valve body having an inner surface and an outer surface, the inner surface and the outer surface defining an inlet, an outlet, and a fluid path therebetween, a track defined in the inner surface, the track defining a bottom surface; a gate having a wing; a scraper having a leading edge, the scraper mounted to the wing of the gate; a biasing element, the biasing element biasing the leading edge of the scraper against the bottom surface of the track.

14 Claims, 13 Drawing Sheets

(51) Int. Cl.
*F16K 3/02* (2006.01)
*F16K 3/12* (2006.01)
*F16K 29/00* (2006.01)
*F16K 3/18* (2006.01)
*F16K 3/30* (2006.01)

(52) U.S. Cl.
CPC ............ *F16K 3/3165* (2013.01); *F16K 29/00* (2013.01); *F16K 3/18* (2013.01); *F16K 3/30* (2013.01); *Y10T 137/0435* (2015.04); *Y10T 137/4273* (2015.04)

(58) Field of Classification Search
CPC .... F16K 3/316; F16K 29/00; Y10T 137/0435; Y10T 137/4273
USPC ..... 137/242, 244, 15.07; 251/318, 326, 328, 251/329; 15/104.16
See application file for complete search history.

(56) References Cited

U.S. PATENT DOCUMENTS

| | | | |
|---|---|---|---|
| 2,793,002 A | 5/1957 | Kellar | |
| 2,820,479 A | 1/1958 | Jenkins | |
| 2,824,715 A | 2/1958 | Williams | |
| 2,982,295 A | 5/1961 | Williams | |
| 3,002,525 A | 10/1961 | Grove | |
| 3,027,135 A | 3/1962 | Kellar | |
| 3,377,049 A | 4/1968 | De Frees | |
| 3,478,771 A | 11/1969 | Johnson | |
| 3,662,778 A | 5/1972 | Leopold | |
| 3,917,223 A | 11/1975 | Sidler et al. | |
| 3,945,606 A | 3/1976 | McDonald | |
| 3,963,214 A | 6/1976 | Hackman et al. | |
| 3,996,750 A | 12/1976 | Brcar | |
| 4,036,260 A | 7/1977 | Davis et al. | |
| 4,429,710 A | 2/1984 | Grieves et al. | |
| 4,483,514 A | 11/1984 | Kennedy | |
| 4,532,957 A | 8/1985 | Battle et al. | |
| 4,541,613 A | 9/1985 | Barbe | |
| 4,607,821 A * | 8/1986 | David | F16J 13/02 220/323 |
| 4,629,160 A | 12/1986 | David | |
| 4,632,362 A | 12/1986 | Lucking | |
| 4,646,777 A | 3/1987 | Stalder et al. | |
| 4,699,359 A | 10/1987 | David | |
| 4,742,990 A | 5/1988 | Stalder et al. | |
| 4,869,459 A | 9/1989 | Bourne | |
| 5,295,661 A | 3/1994 | Roussel | |
| 5,356,838 A | 10/1994 | Kim | |
| 6,663,079 B1 | 12/2003 | Bottenfield | |
| 9,140,368 B2 | 9/2015 | Vanderburg et al. | |

OTHER PUBLICATIONS

Vanderburg, Ralph William; Final Office Action for U.S. Appl. No. 13/834,016, filed Mar. 15, 2013, mailed Jun. 3, 2015, 9 pgs.

Vanderburg, Ralph William; Non-Final Office Action for U.S. Appl. No. 13/834,016, filed Mar. 15, 2013, mailed Nov. 13, 2014, 15 pgs.

Vanderburg, Ralph William; Notice of Allowance for U.S. Appl. No. 13/834,016, filed Mar. 15, 2013, mailed Aug. 13, 2015, 5 pgs.

Vanderburg, Ralph William; U.S. Patent Applciation entitled: Gate Valve With Track Cleanout, U.S. Appl. No. 13/834,016, filed Mar. 15, 2013; 30 pgs.

* cited by examiner

GATE VALVE WITH TRACK CLEANOUT

CROSS-REFERENCE TO RELATED APPLICATION

This application is a continuation of U.S. application Ser. No. 13/834,016, filed Mar. 15, 2013, which is hereby specifically incorporated by reference herein in its entirety.

TECHNICAL FIELD

This disclosure relates to valves. More specifically, this disclosure relates to gate valves.

BACKGROUND

Valve elements are used to regulate or control the flow of material by opening, closing, or partially obstructing various passageways. One type of valve is a gate valve, which can be used in a number of applications.

SUMMARY

Disclosed is a gate valve including a valve body having an inner surface and an outer surface, the inner surface and the outer surface defining an inlet, an outlet, and a fluid path therebetween, a track defined in the inner surface, the track defining a bottom surface; a gate having a wing; a scraper having a leading edge, the scraper mounted to the wing of the gate; a biasing element, the biasing element biasing the leading edge of the scraper against the bottom surface of the track.

Also disclosed is a gate valve including a valve body having an inner surface and an outer surface, the inner surface and the outer surface defining an inlet, an outlet, and a fluid path therebetween, the inner surface defining a bottom sealing surface and a track, the track having a bottom surface and a filleted surface extending between the bottom surface of the track and the bottom sealing surface of the inner surface; a gate engageable with the track of the valve body.

Also disclosed is a method of cleaning a gate valve including accessing a gate valve having a valve body including an inner surface and an outer surface, the inner surface and the outer surface defining an inlet, an outlet, and a fluid path therebetween, the inner surface defining a bottom sealing surface and a track, the track defined out of the fluid path, the track having a bottom surface and a transition surface, the transition surface extending between the bottom surface of the track and the bottom sealing surface of the inner surface; moving a leading edge of a scraper along the bottom surface of the track towards the transition surface of the track; and lifting debris within the track away from the bottom surface of the track into the fluid path.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a gate valve with track cleanout and associated methods, systems, devices, and various apparatus. The gate valve includes a valve body and a gate. It would be understood by one of skill in the art that the disclosed gate valve is described in but a few exemplary embodiments among many. No particular terminology or description should be considered limiting on the disclosure or the scope of any claims issuing therefrom.

Figure 1:
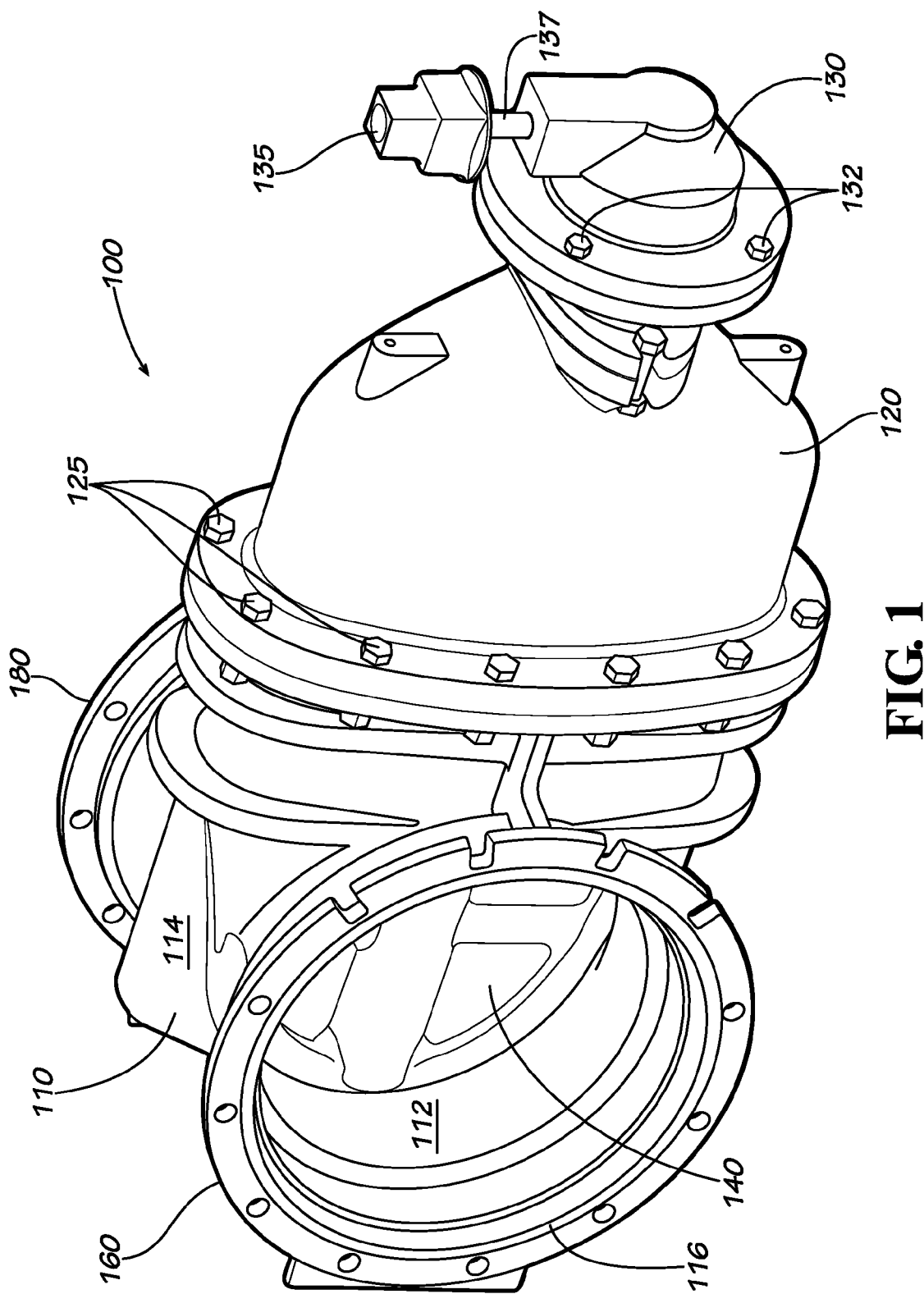
FIG. 1 is a perspective view of a gate valve in accordance with one embodiment of the current disclosure.

One embodiment of a gate valve 100 is disclosed and described in FIG. 1. In the current embodiment, the gate valve 100 includes a valve body 110, a bonnet 120, a top cover 130, and a gate 140. The top cover 130 includes an operating nut 135 mounted on a cover drive shaft 137. The bonnet 120 is coupled to the valve body 110 by a plurality of fasteners 125, and the top cover 130 is coupled to the bonnet 120 by a plurality of fasteners 132. In the current embodiment, the plurality of fasteners 125,132 may comprise, nuts, bolts, or other fasteners known in the art. In some embodiments, the bonnet 120 may be coupled to the valve body 110 and the top cover 130 may be coupled to the bonnet 120 by fasteners, welding, gluing, brackets, bayonet mounts, or any combination of these or other fastening means. In other embodiments, the valve body 110, the bonnet 120, and/or top cover 130 may be formed or molded integrally.

The valve body includes an inner surface 112 and an outer surface 114. The inner surface 112 and the outer surface 114 define an inlet 116 and an outlet 118 (shown in FIG. 2). In the current embodiment, a flanged inlet end 160 is defined at inlet 116 and a flanged outlet end 180 is defined at outlet 118, though the inlet 116 and the outlet 118 may not be flanged in various embodiments. In the current embodiment, the flanged inlet end 160 and the flanged outlet end 180 may be coupled to flanged ends of various pipe elements (not shown) to allow the gate valve 100 to be mounted in a piping system.

Figure 2:
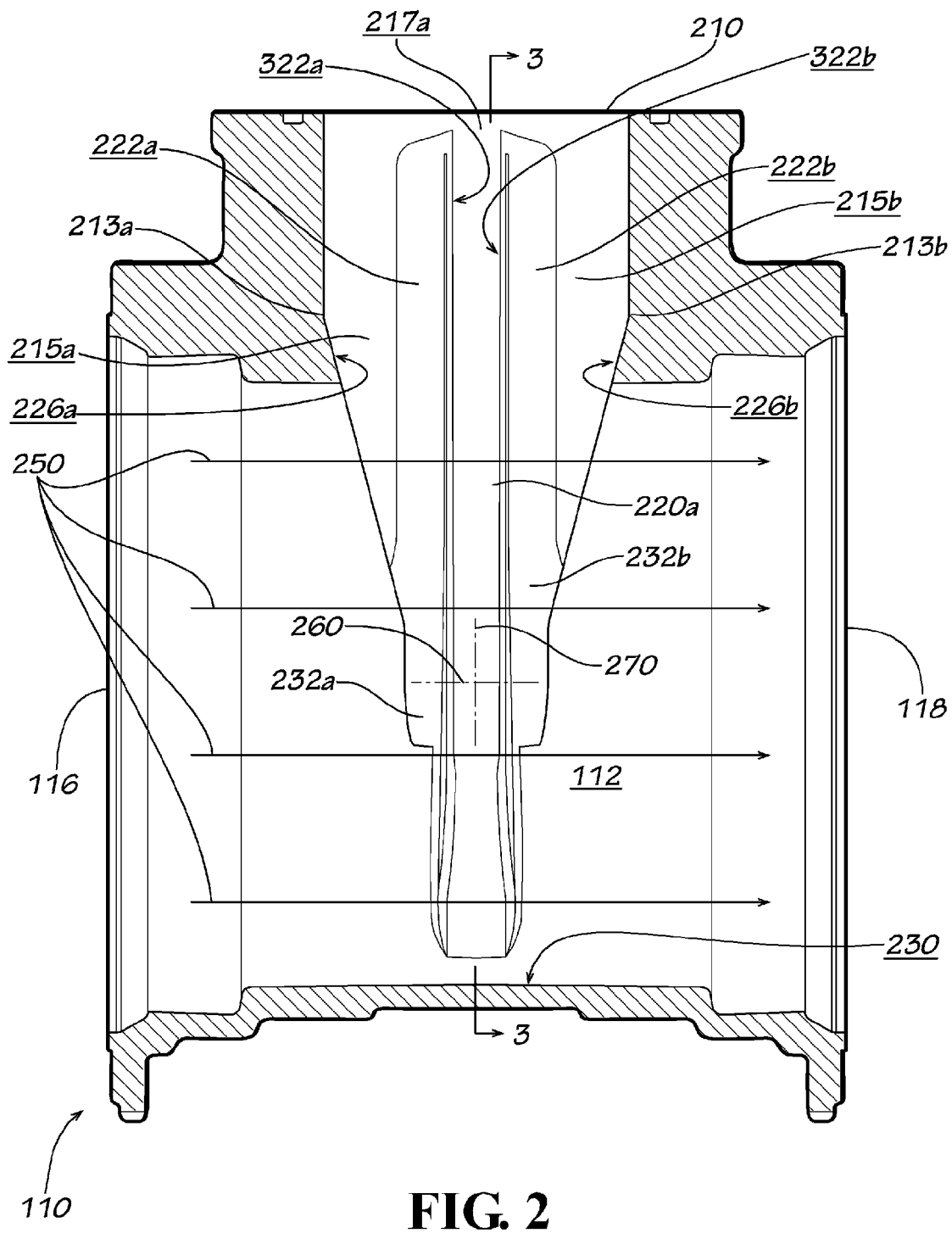
FIG. 2 is a side cross-sectional view of a valve body of the gate valve of FIG. 1.

FIG. 2 shows a side cross-sectional view of the valve body 110 of the current embodiment. As shown in FIG. 2, in the current embodiment, the inner surface 112 and outer surface 114 define a gate opening 210. The inner surface 112 defines a fluid path 250 between the inlet 116 and the outlet 118. In the current embodiment, the fluid path 250 is parallel to an axial direction 260. Perpendicular to the axial direction 260 and extending towards gate opening 210 is radial direction 270. The inner surface 112 also defines tracks 220a,b (220b shown in FIG. 3). The tracks 220a,b extend between the gate opening 210 and a bottom sealing surface 230 defined in the inner surface 112 opposite to the gate opening 210. The track 220a includes track walls 322a,b, and track 220b includes track wall surfaces 324a,b (324a shown in FIG. 3, 324b not shown).

Figure 3:
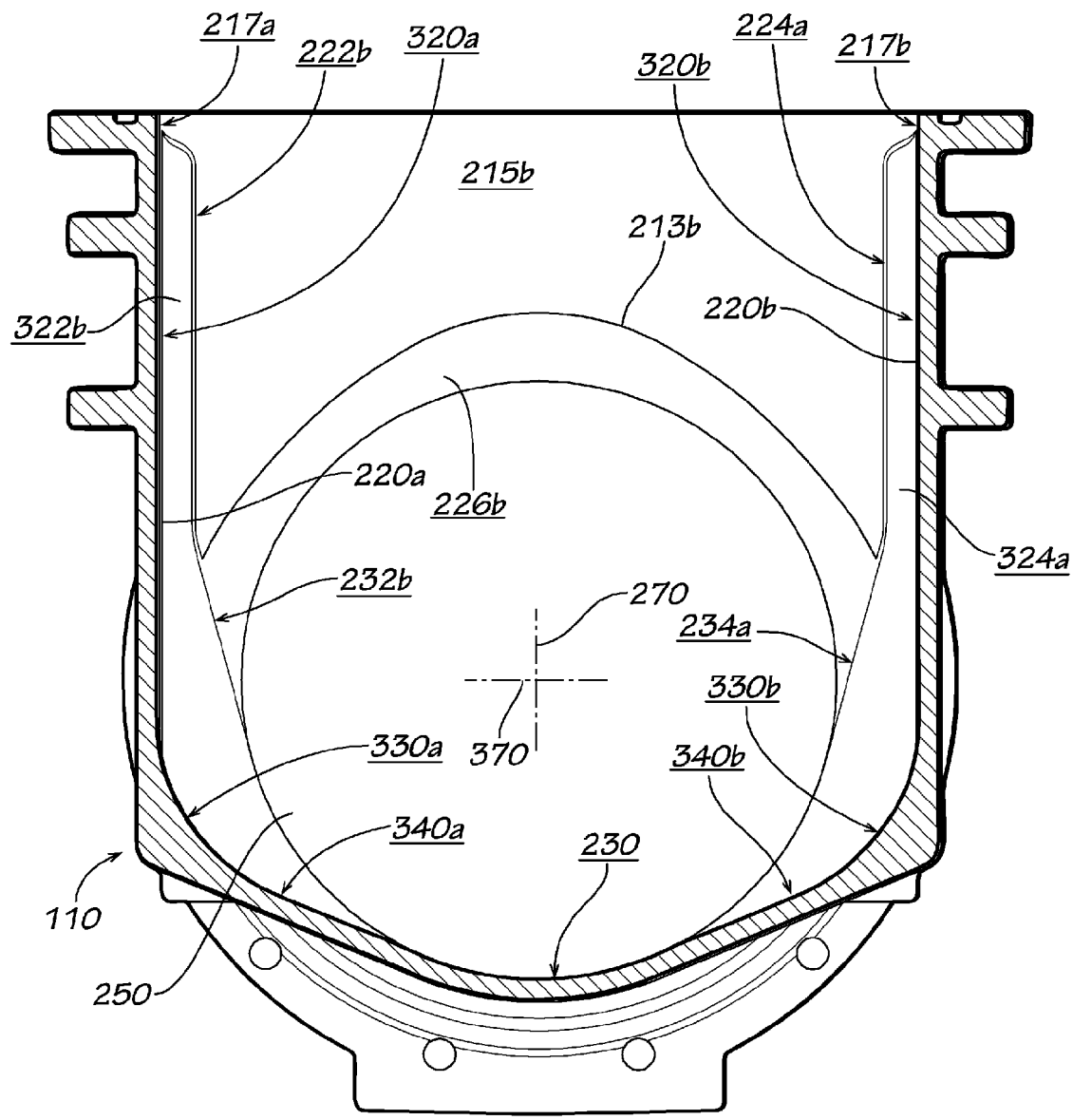
FIG. 3 is a front cross-sectional view of the valve body of FIG. 2 taken along line 3-3.

In the current embodiment, defined adjacent to the track 220a are guide surfaces 222a,b, and defined adjacent to the track 220b are guide surfaces 224a,b (224a shown in FIG. 3, 224b not shown). In the current embodiment, guide surfaces 222a,b,224a,b are flat and parallel to radial direction 270, though the presence, surface shape, and orientation of the guide surfaces 222a,b,224a,b should not be considered limiting. Extending from guide surfaces 222a,b, respectively, adjacent to track 220a, are angled rest surfaces 232a,b, and extending from guide surfaces 224a,b, respectively, adjacent to track 220b, are angled rest surfaces 234a,b (234a shown in FIG. 3, 234b not shown). In the current embodiment, angled rest surfaces 232a,b,234a,b are flat and slope from guide surfaces 222a,b,224a,b, respectively, towards bottom sealing surface 230.

In the current embodiment, a gate opening surface 215a extends between guide surface 222a and guide surface 224b, and a gate opening surface 215b extends between guide surface 222b and guide surface 224a. Gate opening transition surface 217a extends between gate opening 210, guide surfaces 222a,b, track 220a, and gate opening surfaces 215a,b. Gate opening transition surface 217b (shown in FIG. 3) extends between gate opening 210, guide surfaces 224a,b, track 220b, and gate opening surfaces 215a,b. An upper sealing surface 226a extends along a bottom edge 213a of gate opening surface 215a, and an upper sealing surface 226b extends along a bottom edge 213b of gate opening surface 215b. Upper sealing surfaces 226a,b slope inwards from bottom edges 213a,b, respectively, towards tracks 220a,b.

FIG. 3 shows a cross-sectional view of the valve body 110 taken along line 3-3 in FIG. 2. FIG. 3 shows radial direction 270 and a second transverse radial direction 370 perpendicular to radial direction 270. As shown in the FIG. 3, the track 220a defines a track bottom surface 320a, a track filleted surface 330a, and a track transition surface 340a, and the track 220b defines a track bottom surface 320b, a track filleted surface 330b, and a track transition surface 340b. The track bottom surfaces 320a,b extend from gate opening transition surfaces 217a,b, respectively, towards track filleted surfaces 330a,b, respectively. Track filleted surfaces 330a,b extend from track bottom surfaces 320a,b, respectively, towards track transition surfaces 340a,b, respectively. Track transition surfaces 340a,b slope from track filleted surfaces 330a,b towards bottom sealing surface 230. In the current embodiment, track bottom surfaces 320a,b are parallel to radial direction 270 and guide surfaces 222a,b,224a,b, though the presence, surface shape, and orientation of the track bottom surfaces 320a,b should not be considered limiting.

In the current embodiment, track filleted surfaces 330a,b and track transition surfaces 340a,b provide smooth transitions from track bottom surfaces 320a,b to bottom sealing surface 230. In addition, track filleted surfaces 330a,b and track transition surfaces 340a,b provide a smooth transition into the fluid path 250. Track filleted surfaces 330a,b are each formed with a radius sufficient in length to permit debris 1050 (shown in FIG. 10A) to be easily moved from track 220a,b into fluid path 250, so that the debris 1050 is not trapped in track filleted surfaces 330a,b. Moreover, in the current embodiment, the radius of each of track filleted surfaces 330a,b is larger than incidental filleted surfaces formed within tracks by machine or molding tolerances where a sharp corner between flat surfaces is not possible to create, such as in cast iron molding. As shown in FIG. 3, the cross-section of the fluid path 250 taken along line 3-3 is substantially circular in the current embodiment.

As shown in FIG. 3, upper sealing surface 226b extends along the bottom edge 213b of gate opening surface 215b towards angled rest surfaces 232b,234a. Upper sealing surface 226a likewise extends along the bottom edge 213a of gate opening surface 215a towards angled rest surfaces 232a,234b. Upper sealing surfaces 226a,b and angled rest surfaces 232a,b,234a,b thus form, in the current embodiment, continuous sloped surfaces extending between tracks 220a,b, each surface sloping toward bottom sealing surface 230.

Figure 4:
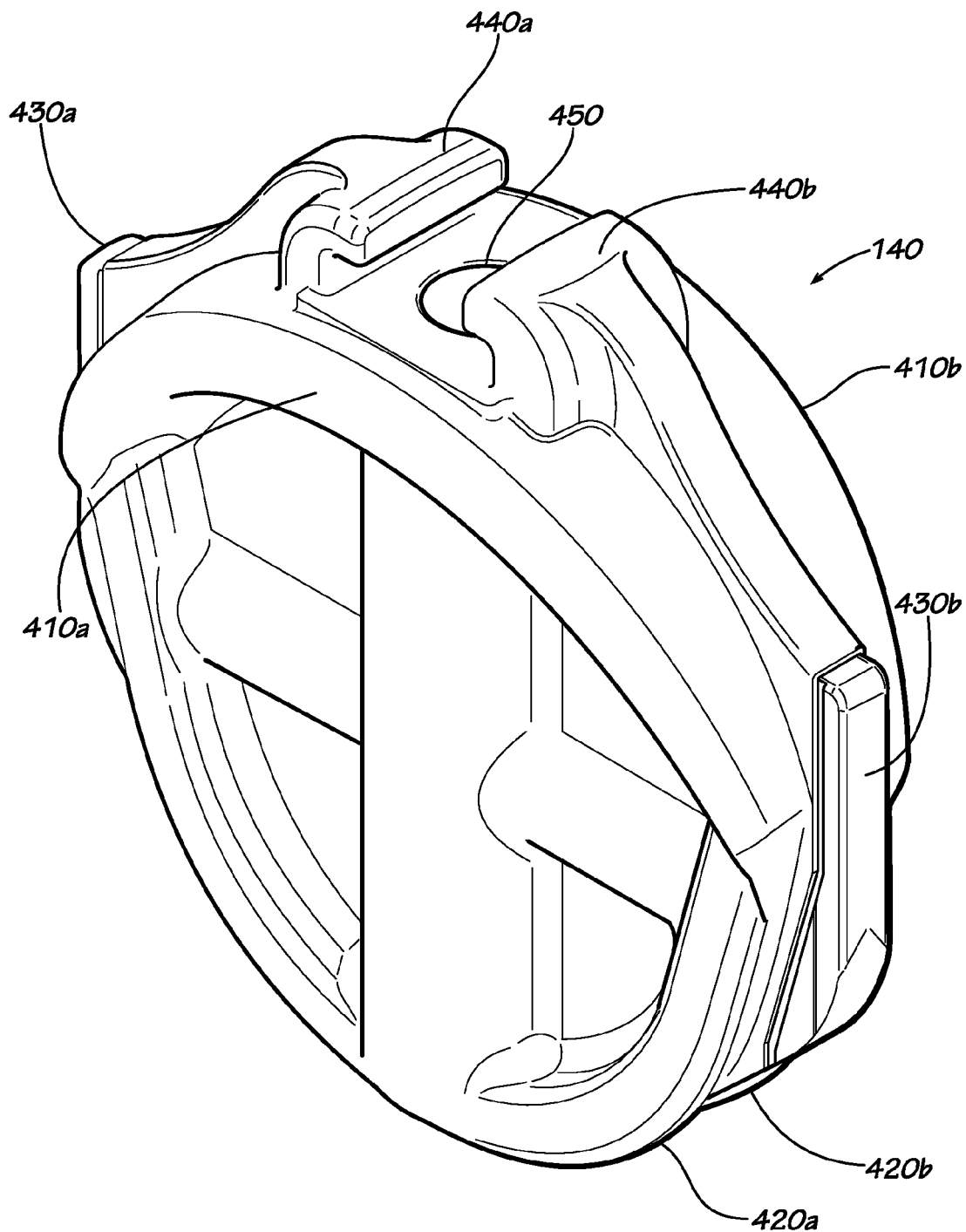
FIG. 4 is a perspective view of the gate of the gate valve of FIG. 1.

FIG. 4 shows a perspective view of gate 140. In the current embodiment, the gate 140 is an encapsulated disc having a rigid cast iron interior and a flexible, water-impervious outer rubber shell, though the gate 140 may include different materials or combinations of materials in various embodiments, such as stainless steel, plastics, wood, fiberglass, or any other material, and the disclosure of an encapsulated disc should not be considered limiting. In the current embodiment, the gate 140 includes upper sealing rims 410a,b, lower sealing lips 420a,b, wings 430a, disc nut retainers 440a,b, and an actuation bore 450.

Figure 5:
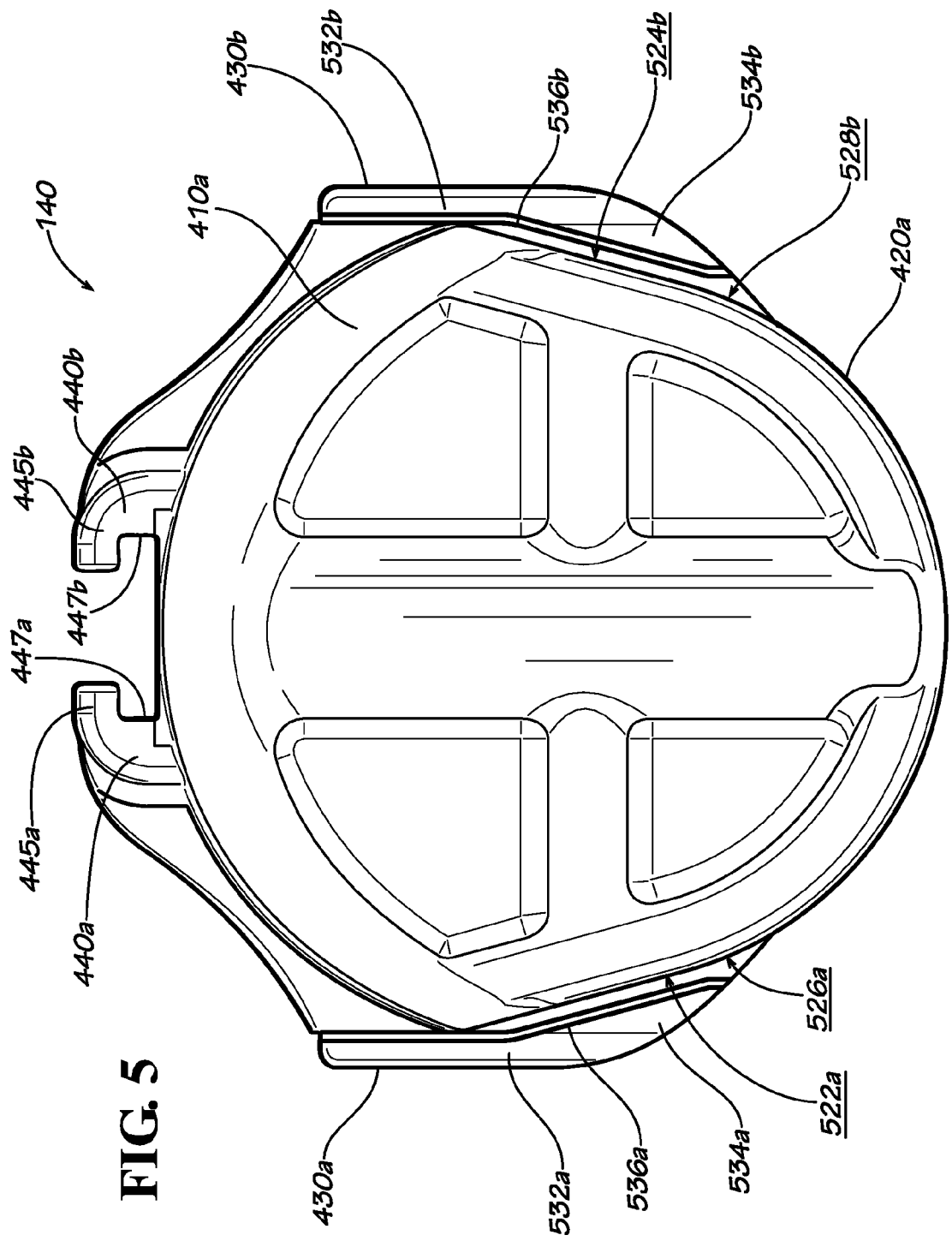
FIG. 5 is a side view of the gate of FIG. 4.

FIG. 5 shows a side view of the gate 140. As shown in FIG. 5, in the current embodiment, the wing 430a includes a straight portion 532a and a filleted portion 534a, and the wing 430b includes a straight portion 532b and a filleted portion 534b. The radii of filleted portions 534a,b, in the current embodiment, are larger than radii of incidental fillets formed by machine or molding tolerances. The wing 430a defines a pair of connection channels 536a,b (536b not shown) on each side of wing 430a, and the wing 430b defines a pair of connection channels 536c,d (536c not shown) on each side of wing 430b. Connection channels 536a,b extend along the base of straight portion 532a and the base of filleted portion 534a, and connection channels 536c,d extend along the base of straight portion 532ba and the base of filleted portion 534b.

In the current embodiment, upper sealing rims 410a,b extend in an approximate C-shaped curve along gate 140 that approximates the curve of upper sealing surfaces 226a, b, respectively. In addition, lower sealing lips 420a,b extends in an approximate C-shaped curve along gate 140 that approximates the curve of bottom sealing surface 230. In the current embodiment, gate 140 also defines angled sealing surfaces 522a,b (522b not shown) adjacent to wing 430a and angled sealing surfaces 524a,b (524a not shown) adjacent to wing 430b. Filleted sealing surfaces 526a,b (526b not shown) are defined on gate 140 between angled sealing surfaces 522a,b, respectively, and lower sealing lips 420a,b, respectively. Likewise, filleted sealing surfaces 528a,b (528a not shown) are defined on gate 140 between angled sealing surfaces 524a,b, respectively, and lower sealing lips 420a,b, respectively. In the current embodiment, the curve formed by angled sealing surface 522a, filleted sealing surface 526a, lower sealing lip 420a, filleted sealing surface 528b, and angled sealing surface 524b is approximately similar to the curve formed by angled sealing surface 522b, filleted sealing surface 526b, lower sealing lip 420b, filleted sealing surface 528a, and angled sealing surface 524a.

In the current embodiment, disc nut retainers 440a,b extend from the gate 140 adjacent to actuation bore 450 on the opposite side of the gate 140 from lower sealing lips 420a,b. Disc nut retainers 440a,b are sized to accept and retain a disc nut 1010 (shown in FIG. 10A). Disc nut retainers 440a,b include retaining ledges 445a,b, respectively, forming retention channels 447a,b, respectively.

Figure 6:
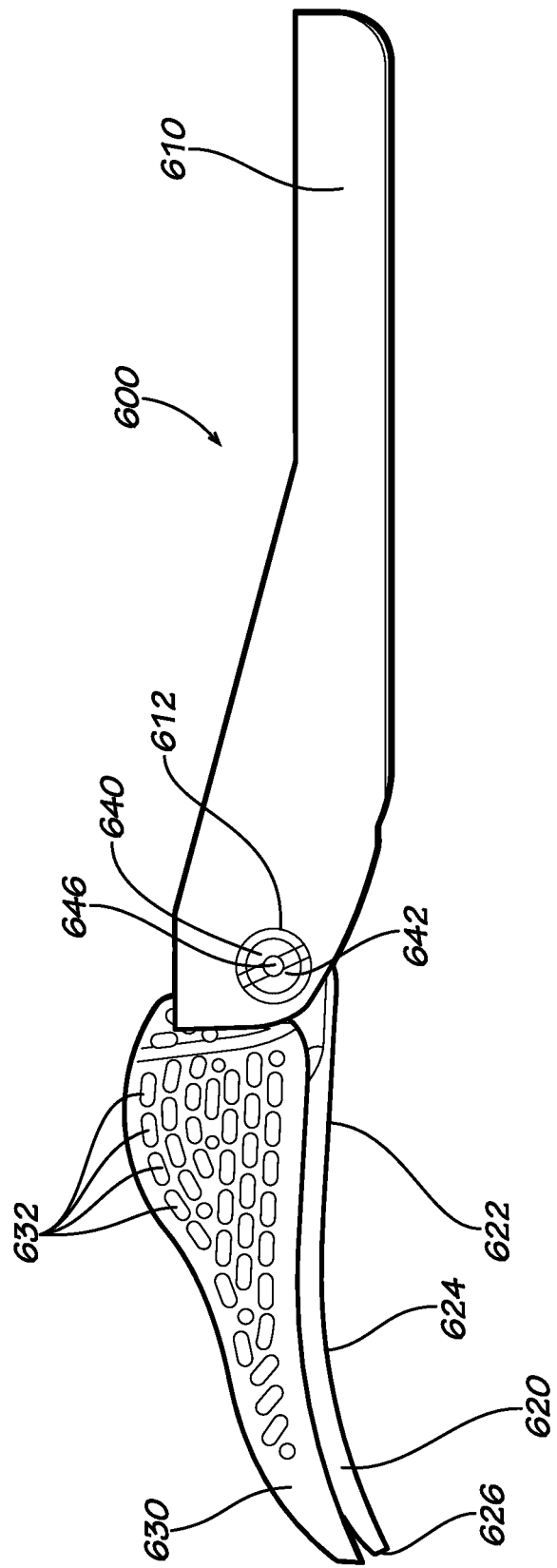
FIG. 6 is a side view of a scraper assembly of the gate valve of FIG. 1 including a scraper, a filler, and a guide cap.

FIG. 6 shows a scraper assembly 600. The scraper assembly 600 includes a guide cap 610, a scraper 620, and a filler 630. In the current embodiment, the guide cap 610 is coupled to the scraper 620 by a hinged connection 640. The filler 630 is coupled to the scraper 620 by gluing, though the filler 630 may be coupled to the scraper 620 by any known method, including welding, fastening by mechanical attachment, overmolding by molding the filler 630 to fully or partially encapsulate the scraper 620, or forming integrally, and the disclosure of gluing should not be considered limiting. In the current embodiment, the filler 630 includes a plurality of through-holes 632 defined extending through the filler 630. In the current embodiment, the filler 630 is formed from a flexible, water-impervious material such as rubber, and the scraper 620 and guide cap 610 are formed of a rigid, water-impervious material such as rigid plastic. In various embodiments, the filler 630, scraper 620, and guide cap 610 may be formed of various materials, and the disclosure of rubber and rigid plastic should not be considered limiting.

In the current embodiment, the scraper 620 includes a flat portion 622, a curved portion 624, and a leading edge 626. The hinged connection 640 includes a first half peg 642, a second half peg 644 (shown in FIG. 8), and a screw 646 connecting first half peg 642 and second half peg 644 to form a hinge pin, though the hinged connection 640 may include various elements in various embodiments, including single-body hinge pins, welded or glued flaps, or intregral flaps created by forming the guide cap 610 and the scraper 620 as a single unit, among others. In the current embodiment, the hinged connection 640 couples the guide cap 610 to the scraper 620 through cap hinge holes 612a,b (612a shown in FIG. 8) defined in the guide cap 610 and through scraper hinge holes 628a,b (628b shown in FIG. 8, 628a not shown).

Figure 7:
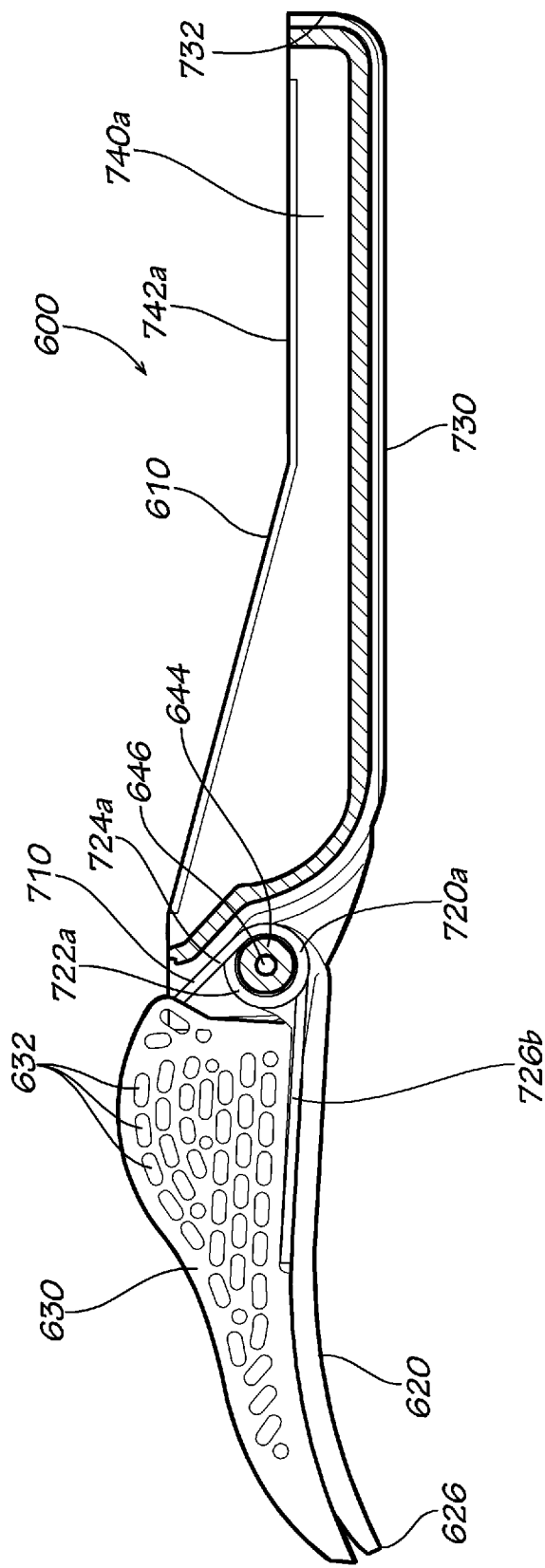
FIG. 7 is a cross-sectional view of the scraper assembly of FIG. 6.
Figure 8:
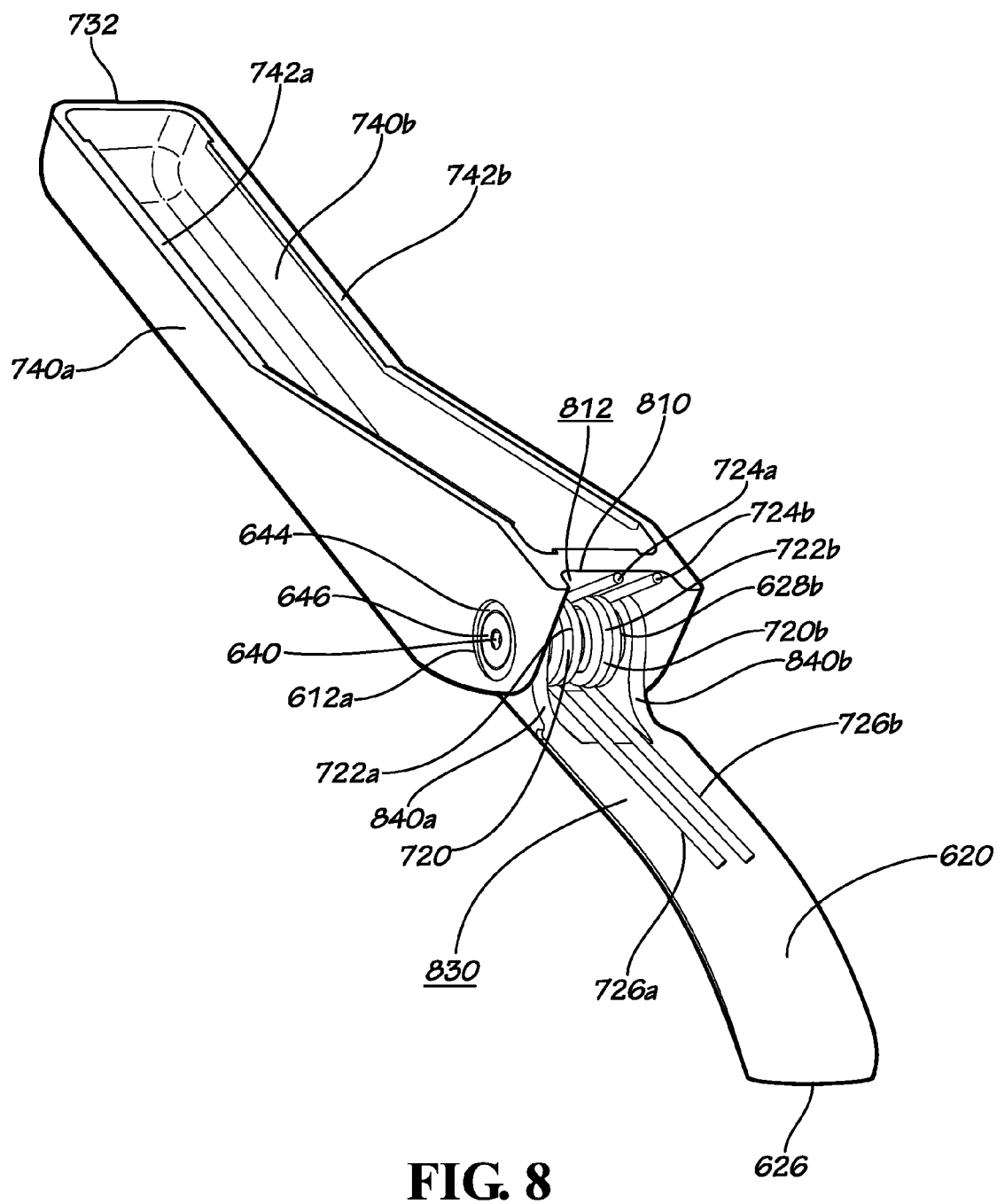
FIG. 8 is a perspective view of the scraper assembly of FIG. 6 with the filler removed.

FIG. 7 shows a cross-sectional view of the scraper assembly 600. As shown in FIG. 7, the scraper assembly 600 also includes a biasing element 710. In the current embodiment, the biasing element 710 is a pair of torsion springs 720a,b (720b shown in FIG. 8) mounted around first half peg 642 and second half peg 644 of the hinged connection 640, though the biasing element 710 may be different in various embodiments, such as compression springs, leaf springs, rubber wedges, a cantilevered rod, or any other method of biasing. Further, biasing element 710 may be mounted in different locations, and the disclosure of the biasing element 710 mounted around hinged connection 640 should not be considered limiting. Biasing element 710 may also be formed into the scraper 620 itself through the shape and composition of the scraper 620, such that the scraper 620 is flexible and elastically deformable to bring the scraper 620 back into its original shape when the scraper 620 is subjected to a flexing force. In the current embodiment, the torsion spring 720a includes a coiled portion 722a, a first leg 724a, and a second leg 726a. Likewise, the torsion spring 720b includes a coiled portion 722b, a first leg 724b, and a second leg 726b, as shown in FIG. 8. The first legs 724a,b contact the guide cap 610, and the second legs 726a,b contact the scraper 620. The second legs 726a,b lie between the scraper 620 and the filler 630.

In the current embodiment, the guide cap 610 includes an outer wall 730, and upper wall 732, and a pair of side walls 740a,b (735b shown in FIG. 8). Defined in side walls 740a,b are connection ridges 742a,b, respectively (742 b shown in FIG. 8). Each connection ridge 742a,b runs along an edge of the side walls 740a,b opposite from outer wall 730. Each connection ridge 742a,b is receivable with connection channels 536c,d, respectively, or connection channels 536a,b, to couple the guide cap 610 to one of the wings 430b,a, and thereby mount the scraper assembly 600 on gate 140.

FIG. 8 shows a perspective view of the scraper assembly 600 with the filler 630 removed. As shown in FIG. 8, the scraper 620 includes a pair of hinge arms 840a,b, each respective hinge arm 840 defining the respective scraper hinge holes 628a,b. In the current embodiment, the guide cap 610 of the current embodiment defines a hinge recess 810 which receives the hinge arms 840a,b and the hinged connection 640. In the current embodiment, the first legs 724a,b of the torsion springs 720a,b contact the guide cap 610 along a cap-spring interaction surface 812, and the second legs 726a,b of the torsion springs 720a,b contact the scraper 620 along a scraper-spring interaction surface 830. Further, as shown in FIG. 8, the screw 646 of the hinged connection 640 is a countersunk-head screw, and the second half peg 644 defines a countersink (not shown) that is sized to accept the countersunk-head screw 646. However, the screw 646 may not be a countersunk-head screw in various embodiments, and the disclosure of a countersunk-head screw should not be considered limiting on the present disclosure. In various embodiments, the screw 646 may be a counterbore-head screw, a hex cap screw, or a domed-head screw, among others.

Figure 9A:
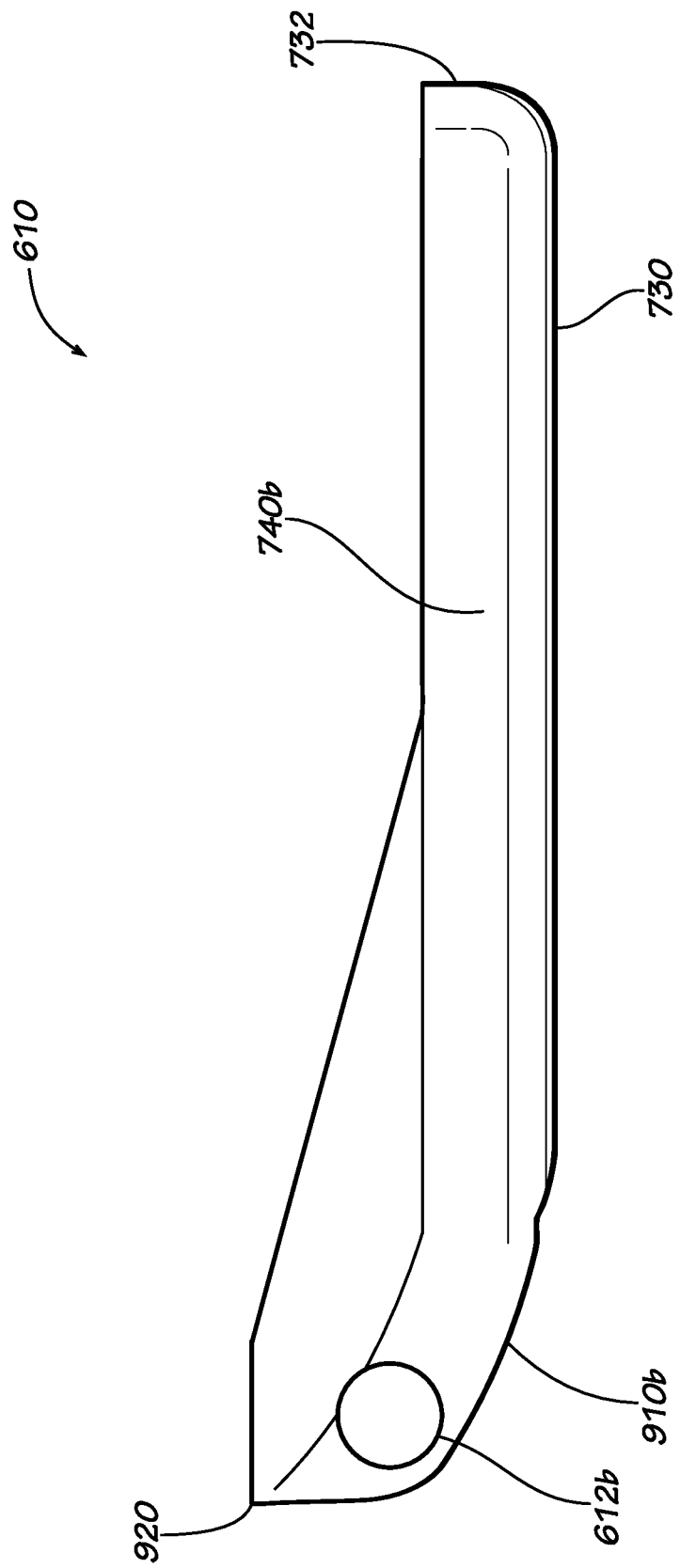
FIG. 9A is a side view of the guide cap of FIG. 6.
Figure 9B:
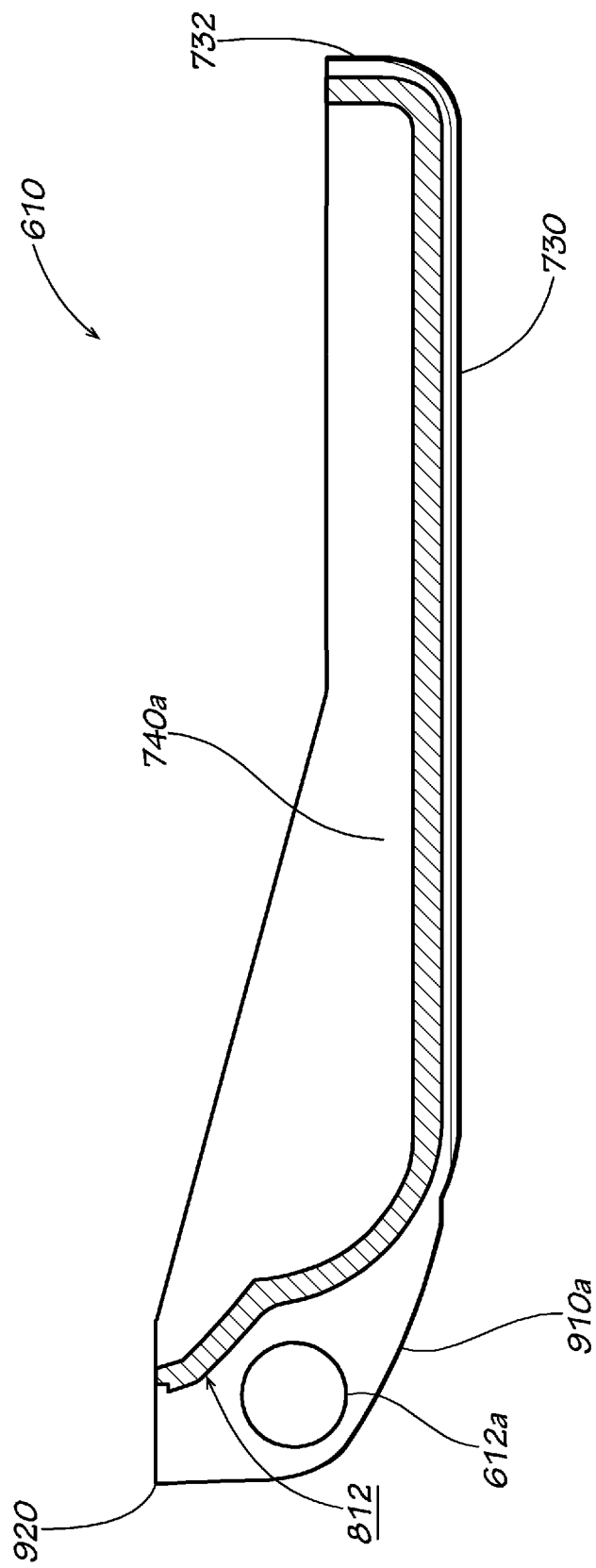
FIG. 9B is a cross-sectional view of the guide cap of FIG. 6.

FIG. 9A shows a side view of the guide cap 610, and FIG. 9B shows a side cross-sectional view of the guide cap 610. As shown in FIG. 9A, the cap hinge hole 612b is defined in side wall 740b, and shown in FIG. 9B, the cap hinge hole 612a is defined in side wall 740a. In the current embodiment, the side walls 740a,b include curved portions 910a,b, respectively. The curved portions 910a,b extend from a lower edge 920 of the guide cap 610 to outer wall 730, forming an outer profile that allows the outer wall 730 to mate with either of track bottom surfaces 320a,b and allows the curved portions 910a,b to rest adjacent to, or mate with, either of track filleted surface 330a,b when the guide cap 610 is coupled to either of wings 430a,b and when the gate 140 is in a closed position within the valve body 110, as shown in FIG. 10C.

Figure 10A:
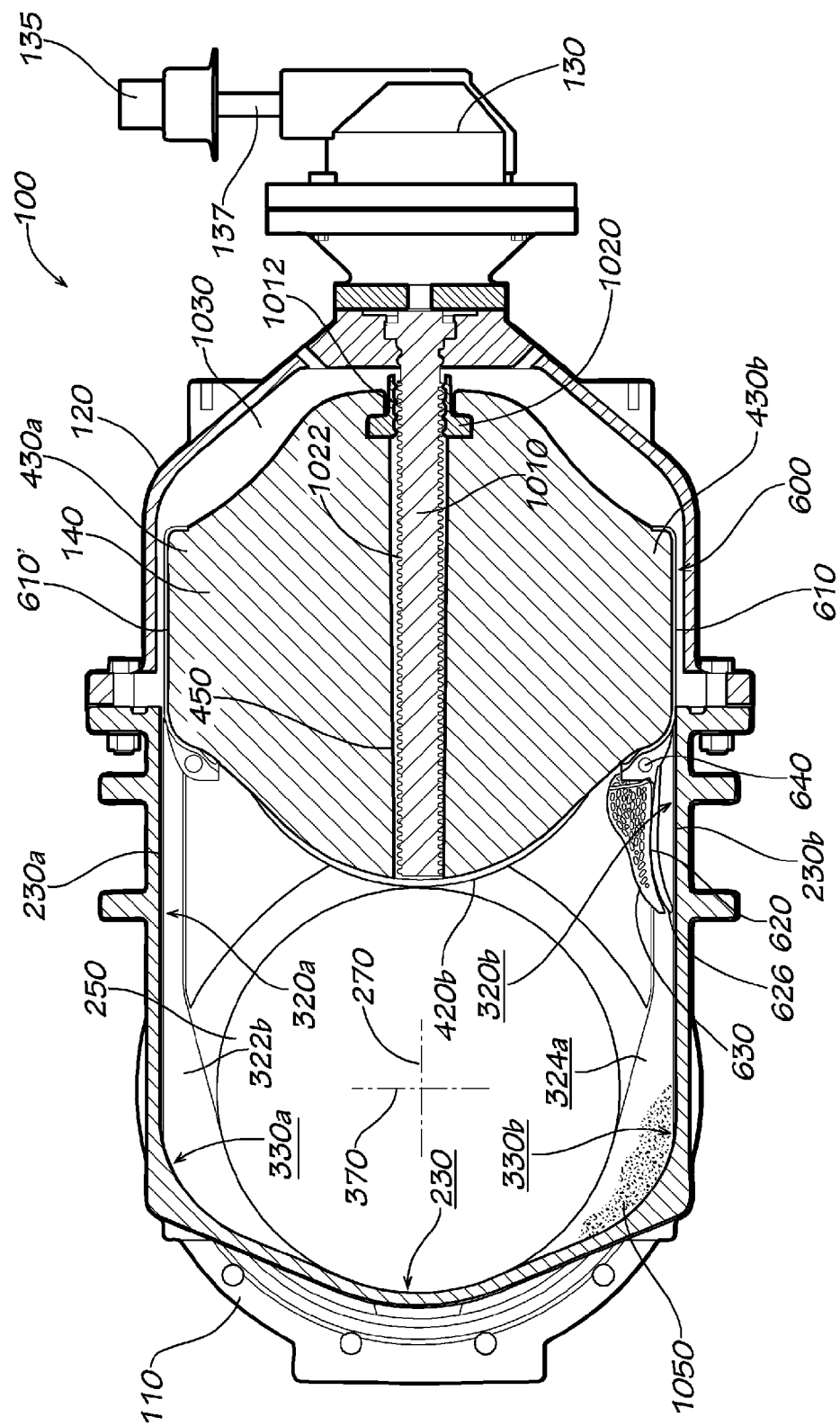
FIG. 10A is a front cross-sectional view of the gate valve of FIG. 1 showing the gate in an open position.
Figure 10B:
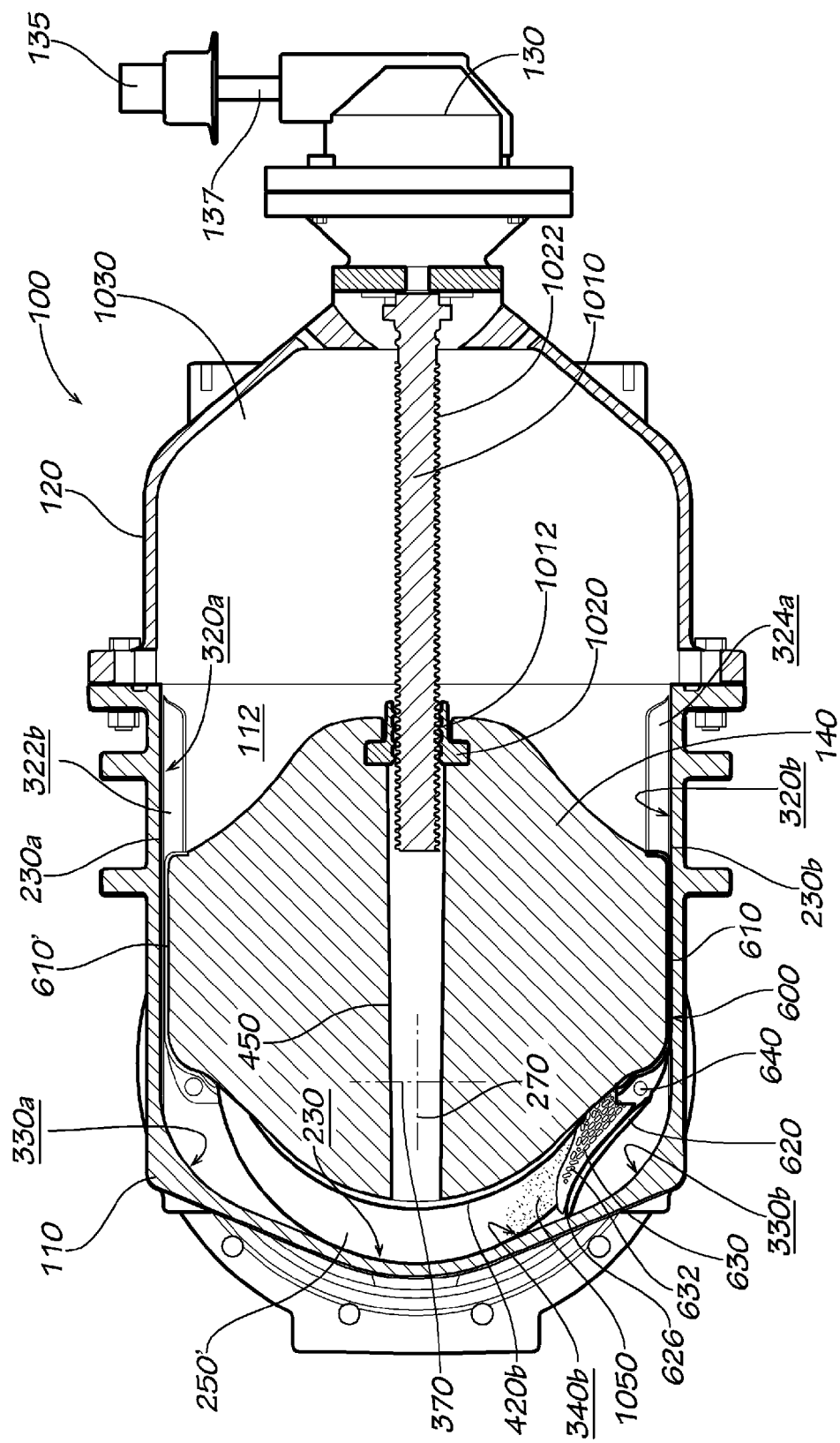
FIG. 10B is a front cross-sectional view of the gate valve of FIG. 1 showing the gate in a partially-closed position.
Figure 10C:
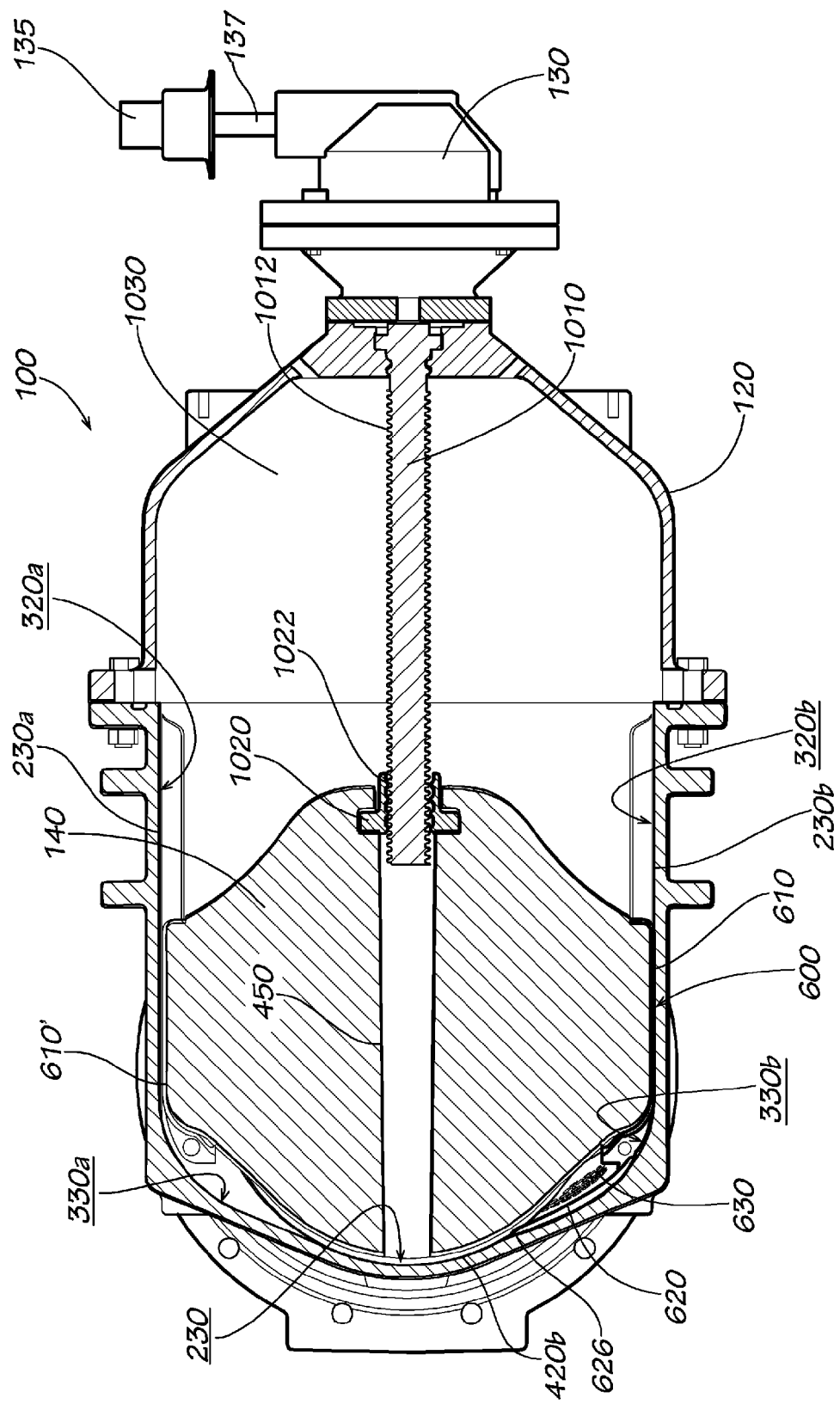
FIG. 10C is a front cross-sectional view of the gate valve of FIG. 1 showing the gate in a fully-closed position.

FIGS. 10A, 10B, and 10C show the gate valve 100 in operation. FIG. 10A shows the gate valve 100 in an open position. In the current embodiment, the gate valve 100 operates with the track 220b vertically lower than the track 220a, and with the radial direction 270 extending horizontally, such that the operating nut 135 is located at a vertical high point of the top cover 130. When the gate valve 100 is oriented in the position shown in FIGS. 10A, 10B, and 10C, the scraper assembly may be mounted on wing 430b. In various embodiments where the gate valve 100 is buried underground and mounted on a water main, for example, placing the gate valve 100 with the radial direction 270 extending horizontally may allow the gate valve 100 to be fully buried at a shallower depth than if the radial direction 270 extends vertically, reducing the digging effort to fully bury the gate valve 100. In various embodiments, the gate valve may be oriented in different positions, and the scraper assembly 600 may be mounted to either wing 430a or wing 430b, or a second scraper assembly 600' similar or identical to scraper assembly 600 may be mounted to wing 430*a* in addition to scraper assembly 600 being mounted to wing 430*b*.

As shown in FIGS. 10A, 10B, and 10C, the disc nut 1010 is retained within disc nut retainers 440*a,b* of the gate 140. The disc nut 1010 has internal threads 1012. Also shown in FIGS. 10A, 10B, and 10C is stem 1020 having external threads 1022. In the current embodiment, stem 1020 is connected to the top cover 130 such that rotation of the operating nut 135 causes rotation of the stem 1020. Rotation of the operating nut 135 in one direction causes rotation of the stem 1020 in one direction, and rotation of the operating nut 135 in the opposite direction causes rotation of the stem 1020 in the opposite direction. External threads 1022 of the stem 1020 interact with internal threads 1012 of the disc nut 1010 to move the disc nut 1010 along stem 1020, thereby moving gate 140 along stem 1020. Rotation of the stem 1020 in one direction causes the disc nut 1010, and thereby the gate 140, to move in one direction towards or away from bottom sealing surface 230, and rotation of the stem 1020 in the opposite direction causes the disc nut 1010, and thereby the gate 140, to move in the opposite direction away from or towards the bottom sealing surface 230. However, the gate 140 may be moved by any method in various embodiments, including a hand crank or hand wheel coupled to the stem 1020, directing fluid pressure to move the gate 140, or using a rod to push or pull the gate 140, for instance, and the disclosure of operating nut 135, disc nut 1010, and stem 1020 should not be considered limiting.

In the open position, the gate 140 is recessed within a gate recess 1030 defined within the bonnet 120 such that the gate 140 is out of fluid path 250. In the current embodiment, the scraper assembly 600 is mounted to the gate 140 by pushing the guide cap 610 onto straight portion 532*b* and a filleted portion 534*b* of wing 430*b*, thereby placing connection ridges 742*a,b* (shown in FIG. 8) within connection channels 536*c,d*, respectively, such that connection ridges 742*a,b* resist removal of scraper assembly 600 from wing 430*b*. Guide cap 610' is mounted to wing 430*a* similarly to guide cap 610 mounted to wing 430*b*. However, in various embodiments, the scraper assembly 600 may be mounted to the gate 140 by any method, including a pin, fastener, gluing, welding, overmolding, or forming the scraper assembly integrally with gate 140, and the disclosure of connection ridges 742*a,b* within connection channels 536*c,d* should not be considered limiting. Further, the disc wings 430*a,b* may be configured to contact outer wall 730 of guide cap 610, along its entirety or along only a portion of outer wall 730, when guide cap 610 is mounted on either of disc wings 430*a,b* in various embodiments or, in other various embodiments, the disc wings 430*a,b* may not contact outer wall 730 when guide cap 610 is mounted on either of disc wings 430*a,b*.

In the open position, the biasing element 710 biases the leading edge 626 of the scraper 620 against track bottom surface 320*b* of the track 220*b*. In the current embodiment, the scraper 620 is sized to fit within track 220*b*, and the leading edge 626 of the scraper 620 is sized to extend approximately between track wall surfaces 324*a,b*. In operation, when a fluid passes along the fluid path 250 from inlet 116 to outlet 118, debris 1050 may accumulate in track 220*b*. Debris 1050 may include sand, dirt, pebbles, grease, or any other material that may be present within the fluid.

FIG. 10B shows the gate 140 in a partially closed position. As shown in FIG. 10B, the guide caps 610, 610' fit within tracks 220*b,a*, respectively. In the current embodiment, the rigid material of the guide caps 610,610' may protect the flexible, water-impervious exterior of the gate 140 from the inner surface 112 of the valve body 110 and may allow the gate 140 to slide easily within tracks 220*b,a*. As the gate 140 approaches the closed position and bottom sealing surface 230, the leading edge 626 of the scraper 620 slides along track filleted surface 330*b*, sliding partially in a direction parallel to second transverse radial direction 370. As the leading edge 626 of the scraper 620 slides along track filleted surface 330*b*, the scraper 620 and filler 630 lift debris 1050 into a shrunken fluid path 250'. As the gate 140 approaches bottom sealing surface 230, the fluid path 250 shrinks, and when shrunken fluid path 250' is present, fluid flow through shrunken fluid path 250' is increased as the cross-sectional area between gate 140 and bottom sealing surface 230 in which fluid can travel shrinks. This increased fluid flow assists in carrying away debris 1050 as the scraper 620 and filler 630 lift the debris 1050 into shrunken fluid path 250'.

As the leading edge 626 slides along track filleted surface 330*b* and track transition surface 340*b* partially in a direction parallel to second transverse radial direction 370, the scraper 620 rotates about hinged connection 640, pressing filler 630 against gate 140, thereby compressing filler 630. In the current embodiment, through-holes 632 of the filler 630 allow fluid to pass through filler 630 and allow compression of filler 630 against gate 140.

FIG. 10C shows the gate 140 in a fully closed position. As shown in FIG. 10C, lower sealing lips 420*a,b* of the gate 140 are in contact with the bottom sealing surface 230 and the debris 1050 has been removed. No fluid path exists when the gate 140 is in the closed position. The leading edge 626 of the scraper 620 is in contact with the bottom sealing surface 230, compressing the filler 630 between the scraper 620 and the gate 140, though the leading edge 626 may be in contact with the track filleted surface 330*b* or a track transition surface 340*b* in various embodiments. In addition, the scraper 620 may also be flexible so that the scraper 620 may bend to conform with the track filleted surfaces 330*b* and the track transition surface 340*b* when the gate 140 is in the closed position, as shown in FIG. 10C. In the current embodiment, the guide caps 610,610' rest within tracks 220*b,a*, respectively along track bottom surfaces 320*b,a*, respectively, and track filleted surfaces 330*b,a*, respectively.

In addition, in the current embodiment, upper sealing rims 410*a,b* are in sealing contact with upper sealing surfaces 226*a,b*, respectively. Further, angled sealing surface 522*a*, filleted sealing surface 526*a*, lower sealing lip 420*a*, filleted sealing surface 528*b*, and angled sealing surface 524*b* are in sealing contact with angled rest surface 232*a*, bottom sealing surface 230, and angled rest surface 234*b*. Further, angled sealing surface 522*b*, filleted sealing surface 526*b*, lower sealing lip 420*b*, filleted sealing surface 528*a*, and angled sealing surface 524*a* are in sealing contact with angled rest surface 232*b*, bottom sealing surface 230, and angled rest surface 234*a*. In various embodiments, fluid may press against gate 140 in the closed position and may allowably break the seal between upper sealing rims 410*a* and upper sealing surface 226*a*, entering gate recess 1030. However, the seal between upper sealing rims 410*b* and upper sealing surface 226*b* would still be maintained, preventing fluid from flowing around gate 140 towards outlet 118.

When the gate 140 is moved towards the open position by rotating the stem 1020 in the opposite direction, the fluid path 250 is reopened, allowing fluid to flow from inlet 116 to outlet 118. The leading edge 626 of the scraper 620 is biased against track transition surface 340*b*, track filleted surface 330b, and the track bottom surface 320b of the track 220b as the gate 140 returns to the open position. The process shown in FIGS. 10A, 10B, and 10C may be repeated if some debris 1050 remains in track 220b, or at a later time if debris 1050 again accumulates within track 220b.

In various embodiments, the filler 630 may not be included in scraper assembly 600. In addition, in various embodiments, the scraper 620 may be directly mounted to the gate 140 by various connections, including hinges. The biasing element 710 may be integrated into any of the scraper 620, guide cap 610, or gate 140, or may be included as a separate element that interacts with any of the scraper 620, guide cap 610, or gate 140 in various embodiments.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gate valve comprising:
a valve body having an inner surface and an outer surface, the inner surface and the outer surface defining an inlet, an outlet, and a fluid path therebetween, a track defined in the inner surface, the track defining a bottom surface;
a gate having a wing;
a scraper having a flat portion extending parallel to the bottom surface of the track when the scraper is at rest and a curved portion extending from the flat portion, the curved portion comprising a profile bending toward the bottom surface of the track when the scraper is at rest and terminating in a leading edge, the scraper mounted to the wing of the gate; and
a biasing element, the biasing element biasing the leading edge of the scraper against the bottom surface of the track.

2. The gate valve of claim 1, wherein the biasing element is at least one torsion spring.

3. The gate valve of claim 2, wherein the at least one torsion spring is two torsion springs.

4. The gate valve of claim 1, wherein the track defines a filleted surface extending from the bottom surface of the track.

5. The gate valve of claim 4, wherein the track further defines a transition surface extending from the filleted surface to a bottom sealing surface of the valve body, the transition surface and the filleted surface forming a smooth transition between the bottom surface of the track and the fluid path, and wherein the gate is contactable with the bottom sealing surface of the valve body.

6. The gate valve of claim 1, further comprising a guide cap mounted on the wing of the gate, the guide cap connected to the scraper.

7. The gate valve of claim 6, wherein:
the guide cap includes at least one connection ridge;
the wing of the gate includes at least one connection channel; and
the guide cap is mounted on the wing by placement of the connection ridge of the guide cap within the connection channel of the wing.

8. The gate valve of claim 6, wherein the guide cap is connected to the scraper by a hinged connection.

9. The gate valve of claim 8, wherein the biasing element is mounted to the hinged connection.

10. A gate valve comprising:
a valve body having an inner surface and an outer surface, the inner surface and the outer surface defining an inlet, an outlet, and a fluid path therebetween, the inner surface defining a bottom sealing surface and a track, the track having a bottom surface and a filleted surface extending between the bottom surface of the track and the bottom sealing surface of the inner surface;
a gate engageable with the track of the valve body, the gate comprising a wing defining a connection channel; and
a guide cap mounted to the gate, the guide cap having a side wall including a curved portion, the curved portion of the side wall resting adjacent to the filleted surface of the track when the gate is in a closed position within the valve body, the side wall defining a connection ridge receivable within the connection channel.

11. The gate valve of claim 10, wherein the wing of the gate includes a filleted portion and a straight portion.

12. The gate valve of claim 10, wherein the track includes a transition surface extending from the filleted surface to the bottom sealing surface of the inner surface.

13. The gate valve of claim 10, further comprising a scraper mounted to the guide cap, the scraper contacting the track.

14. The gate valve of claim 12, further comprising filler coupled to the scraper, the filler formed from a flexible, water-impervious material and having a through-hole formed therein allowing water to pass through the filler when the gate is in an open position or in a partially-closed position.

* * * * *